United States Patent [19]

Ikeda et al.

[11] Patent Number: 4,886,424

[45] Date of Patent: Dec. 12, 1989

[54] MULTI-PISTON SWASH PLATE TYPE COMPRESSOR WITH DAMPING ARRANGEMENT FOR DISCHARGE REED VALVES

[75] Inventors: Hayato Ikeda; Hisato Kawamura; Shinichi Ishihara, all of Kariya, Japan

[73] Assignee: Kabushiki Kaisha Toyoda Jidoshokki Seisakusho, Aichi, Japan

[21] Appl. No.: 166,443

[22] Filed: Mar. 9, 1988

[30] Foreign Application Priority Data

Mar. 11, 1987 [JP] Japan .............................. 62-036109[U]

[51] Int. Cl.[4] .................... F04B 25/04; F04B 39/10
[52] U.S. Cl. .................... 417/269; 417/571; 92/79; 137/246; 137/512.15; 137/856
[58] Field of Search ............ 417/269, 571, 569; 92/79; 418/DIG. 1; 137/246, 246.23, 512.15, 574, 855, 856

[56] References Cited

U.S. PATENT DOCUMENTS

| | | | |
|---|---|---|---|
| 2,154,228 | 4/1939 | Borresen | 137/246.23 |
| 4,283,997 | 8/1981 | Takahashi et al. | 92/79 |
| 4,290,345 | 9/1981 | Hiraga et al. | 92/79 |
| 4,392,788 | 7/1983 | Nakamura et al. | 92/79 X |
| 4,444,219 | 4/1984 | Hollenstein | 137/246 |
| 4,746,275 | 5/1988 | Iwamori et al. | 417/269 |

Primary Examiner—Carlson R. Croyle
Assistant Examiner—Leonard P. Walnoha
Attorney, Agent, or Firm—Burgess, Ryan & Wayne

[57] ABSTRACT

A multi-piston swash plate type compressor for an air-conditioning system used in a vehicle such as an automobile, including a cylinder block body having a swash plate chamber formed therein for receiving a swash plate and cylinder bores formed therein for receiving pistons which are reciprocated by rotation of the swash plate. The compressor has a suction chamber which is fed with a refrigerant including lubricating oil from an evaporator of the air-conditioning system and a discharge chamber which feeds the compressed refrigerant to a condenser of the air-conditioning system. When the compressed refrigerant is discharged from the cylinder bore into the discharge chamber through a discharge reed valve, all of the discharged refrigerant is impinged on the peripheral and inner wall so as to separate the lubricating oil from the refrigerant, whereby an effective damping and sealing oil layer is formed between the discharge reed valve and the valve seat thereof.

5 Claims, 2 Drawing Sheets

MULTI-PISTON SWASH PLATE TYPE COMPRESSOR WITH DAMPING ARRANGEMENT FOR DISCHARGE REED VALVES

BACKGROUND OF THE INVENTION (1) Field of the Invention

The present invention relates to a compressor for an air-conditioning system used in a vehicle such as an automobile, more particularly, to a multi-piston swash plate type compressor having a damping arrangement for discharge reed valves therein.

(2) Description of the Related Art

A well known multi-piston swash plate type compressor comprises: a cylinder block body assembled from a pair of cylinder block halves to form a swash plate chamber therebetween, the cylinder block halves having the same number of cylinder bores which are radially formed and arranged with respect to the central axis of the cylinder block body, the cylinder bores of one cylinder block half being aligned and registered with the cylinder bores of the other cylinder block half, respectively, with the swash plate chamber intervening therebetween; common piston members slidably received in the pairs of aligned cylinder bores, respectively; a swash plate member disposed within the swash plate chamber to be slidably engaged with the common piston members so that the piston members are reciprocated in the pairs of aligned cylinder bores, respectively, by rotation of the swash plate member; a shaft member which extends into an axial bore of the cylinder block body so that it passes through the swash plate chamber and on which the swash plate member is fixedly mounted; a pair of radial bearings provided within the axial bore sections in the cylinder block halves, respectively, for rotatably supporting the shaft member in the axial bore of the cylinder block body; a pair of thrust bearings provided around the shaft member at the sides of the swash plate member; a pair of dish-like housing members mounted on the end faces of the cylinder block body, respectively, so as to form a suction chamber and a discharge chamber between each of the dish-like housing members and the corresponding end face of the cylinder body; and a disc-like reed valve assembly disposed between each of the dish-like housing member and the corresponding end face of the cylinder block body so that each of the cylinder bores is communicated with the corresponding suction and discharge chambers through the intermediary of the corresponding suction and discharge reed valve elements of the disc-like reed valve assembly.

Referring to the disc-like reed valve assembly, in particular, this comprises: an end plate member having sets of a suction port and a discharge port, each set of which is adapted to be communicated with the corresponding cylinder bore; a first valve sheet member disposed between the corresponding end face of the cylinder block body and the inner side surface of the end plate member and having suction reed valve elements formed therein, each of which is arranged so as to open and close the corresponding suction port of the end plate member; a second valve sheet member attached to the outer side surface of the end plate member and having discharge reed valve elements formed therein, each of which is arranged so as to open and close the corresponding discharge port of the end plate member; and a retainer plate member then attached to the second valve sheet member and having retainer elements formed therein, each of which is arranged so as to restrain a lift of the corresponding discharge reed valve element. Note, both the second valve sheet member and the retainer plate member have through holes, each of which is aligned and registered with the corresponding suction port of the end plate member.

In operation, the shaft member is driven by the engine of a vehicle such as an automobile so that the swash plate member is rotated within the swash plate chamber. The rotational movement of the swash plate chamber causes the piston members to be reciprocated in the pairs of aligned cylinder bores so that the piston members alternately execute a suction stroke and a compression stroke. While each of the piston member executes the suction stroke, the suction reed valve element is opened and the discharge reed valve element is closed, so that a refrigerant is sucked in the cylinder bore from the suction chamber, which is communicated with an evaporator of an air-conditioning system, through the suction port of the end plate member. Then, when the piston member executes the compression stroke, the suction reed valve element is closed and the discharge reed valve element is opened, so that the sucked refrigerant is compressed and discharged into the discharge chamber through the discharge port of the end plate member. As is well known, the refrigerant circulating in the air-conditioning system includes a lubricating oil dispersed there in as a mist. This is intended to ensure that the movable parts of the compressor, such as the radial bearings, the thrust bearings, the swash plate member, etc., are lubricated with the lubricating oil included in the refrigerant during the passage of the refrigerant through the compressor. It is also intended to ensure that an oil layer is formed by the lubricating oil included in the refrigerant between the reed valve element and the valve seat thereof, which corresponds to an annular area surface surrounding the ports of the end plate member. In particular, such an oil layer serves as a damping and sealing layer so that an impact of the reed valve element can be absorbed by the oil layer when the reed valve element impinges against the valve seat, and so that when the reed valve element is closed, it can be effectively sealed against the valve seat due to the existence of the oil.

Note, in the conventional compressor as mentioned above, the retainer elements of the retainer plate member of the disc-like reed valve assembly are arranged to slope away from the surface of the retainer plate member toward a peripheral interior wall surface of the discharge chamber, so that a portion of the discharged refrigerant is guided by the sloped retainer element to flow out toward the peripheral and interior wall surface of the discharge chamber to collide therewith. When the flow of refrigerant collides with the peripheral and interior wall surface of the discharge chamber, the oil mist therein is separated from the refrigerant flow so that oil droplets appear on the peripheral and interior wall surface of the discharge chamber. These oil droplets form an oil flow and thus contribute to formation of the oil layer between the discharge reed valve element and the valve seat thereof. However, in practice, the portion of the discharged refrigerant which is guided by the sloped retainer element to collide with the peripheral and interior wall surface of the discharge chamber is small because a large portion of the discharged refrigerant escapes from opposed triangle side opening zones which are formed between the opposed side edges of the sloped retainer element and the surface of the retainer plate member. Accordingly, it is impossible to obtain a sufficient oil flow which can contribute to the formation of the oil layer between the discharge reed valve element and the valve seat thereof. For this reason, the conventional compressor possesses drawbacks in that the discharge reed valves are damaged because of a poor formation of the oil layer between the discharge reed valve element and the valve seat, and in that it is impossible to obtain an effective oil seal between the discharge reed valve element and the valve seat and thus the compressor operates at a low efficiency.

SUMMARY OF THE INVENTION

Accordingly, it is an object of the present invention to provide a multi-piston swash plate type compressor having a damping arrangement for discharge reed valves included therein, which is so constructed that a sufficient oil layer can be formed between the discharge reed valves and the valve seats thereof, whereby an impact of the discharge reed valves can be effectively absorbed when during impingement thereof on the valve seats, and whereby an effective oil seal can be obtained between the discharge reed valves and the valve seats.

In accordance with the present invention, there is provided a multi-piston swash plate type compressor for an air-conditioning system used in a vehicle such as an automobile. This compressor comprises a cylinder block means in which a swash plate chamber is formed for receiving a swash plate member and which has cylinder bores radially formed and arranged with respect to a central axis thereof. Each of the cylinder bores receives a piston member so as to be slidably engaged with the swash plate member to reciprocate the piston member in the corresponding cylinder bore by rotation of the swash plate member. The swash plate member is fixedly mounted on a shaft member which extends into the swash plate chamber through an axial bore formed in the cylinder block means and which is adapted to be connected to a prime motor of the vehicle for rotation of the swash plate member. The compressor also comprises housing means provided on the cylinder block means for forming a suction chamber which is communicated with the cylinder bores through the intermediary of a suction reed valve element and a discharge chamber which is communicated with the cylinder bores through the intermediary of a discharge reed valve element. The suction chamber is adapted to be communicated with an evaporator of the air-conditioning system so as to be fed with a refrigerant including lubricating oil therefrom, and the discharge chamber is adapted to be communicated with a condenser of the air-conditioning system for feeding a compressed refrigerant thereto. The compressor further comprises retaining means for restraining a lift of the discharge reed valve element. The retaining means is arranged so that all of a compressed refrigerant discharged through the discharge reed valve element is impinged on a peripheral and interior wall surface of the discharge chamber to separate the lubricating oil from the discharged refrigerant, whereby the separated lubricating oil serves as an oil source for forming an effective damping and sealing oil layer between the discharge reed valve element and the valve seat thereof. This compressor may further comprise oil-guiding means for reserving and guiding the separated lubricating oil as an oil flow toward the discharge reed valve element.

According to the present invention, there is also provided a multi-piston swash plate type compressor for an air-conditioning system used in a vehicle such as an automobile, which comprises: a cylinder block body which is assembled from a pair of cylinder block halves to form a swash plate chamber therebetween, the cylinder block halves having the same number of cylinder bores which are radially formed and arranged with respect to a central axis of said cylinder block body, the cylinder bores of one of the cylinder block halves being aligned and registered with the cylinder bores of the other cylinder block half, respectively, with the swash plate chamber intervening therebetween; common piston members slidably received in pairs of aligned cylinder bores, respectively; a swash plate member which is disposed within the swash plate chamber to be slidably engaged with the common piston members so that the piston members are reciprocated in the pairs of aligned cylinder bores, respectively, by rotation of the swash plate member; a shaft member which extends into an axial bore of the cylinder block body and passes through the swash plate chamber and on which the swash plate member is fixedly mounted; a pair of dish-like housing members which are mounted on end faces of the cylinder block body, respectively, so as to form a suction chamber and a discharge chamber between each of the dish-like housing members and the corresponding end face of the cylinder block body; a disc-like reed valve assembly which is disposed between each of the dish-like housing members and the corresponding end face of the cylinder block body, the disc-like reed valve assembly including an end plate member having sets of a suction port and a discharge port, each set of which is adapted to be communicated with the corresponding cylinder bore, a first valve sheet member disposed between the corresponding end face of the cylinder block body and the inner side surface of the end plate member and having suction reed valve elements formed therein, each of which is arranged so as to open and close the corresponding suction port of the end plate member, a second valve sheet member attached to the outer side surface of the end plate member and having discharge reed valve elements formed therein, each of which is arranged so as to open and close the corresponding discharge port of the end plate member, and a retainer plate member then attached to the second valve sheet member and having retainer elements formed therein, each of which is arranged so as to restrain a lift of the corresponding discharge reed valve element, both the second valve sheet member and the retainer plate member having through holes, each of which is aligned and registrated with the corresponding suction port of the end plate member; and the suction chamber being adapted to be communicated with an evaporator of the air-conditioning system so as to be fed with a refrigerant including lubricating oil therefrom, the discharge chamber being adapted to be communicated with a condenser of the air-conditioning system for feeding a compressed refrigerant thereto, each of the retainer elements being arranged so that all of a compressed refrigerant discharged from the corresponding discharge port through the corresponding discharge reed valve element is impinged on a peripheral and interior wall surface of said discharge chamber to separate a lubricating oil from the discharged refrigerant, whereby the separated lubricating oil serves as an oil source for forming an effective damping and sealing oil layer between the discharge reed valve element and the valve seat thereof.

In this compressor, each of the retainer elements may be shaped so as to slope away from the surface of the retainer plate member toward the peripheral and interior wall surface of the discharge chamber, each retainer element having opposed triangle side wall portions which extend from the opposed side edges of the sloped retainer element to the surface of said retainer plate member. With this arrangement, it is ensured that the compressed refrigerant discharged from each of the discharge ports through the corresponding discharge reed valve element is impinged on the peripheral and interior wall surface of the discharge chamber. Preferably, a recess is formed in the surface of said retainer plate member in the vicinity of an exit opening defined by each of the retainer elements and the opposed triangle side wall portions thereof, so that the recess serves to reserve and guide the separated lubricating oil as an oil flow toward the corresponding discharge reed valve element.

BRIEF DESCRIPTION OF THE DRAWINGS

These and other objects of the present invention will be better understood from the following description, with reference to the accompanying drawings, in which.

DESCRIPTION OF THE PREFERRED EMBODIMENT

Figure 1:
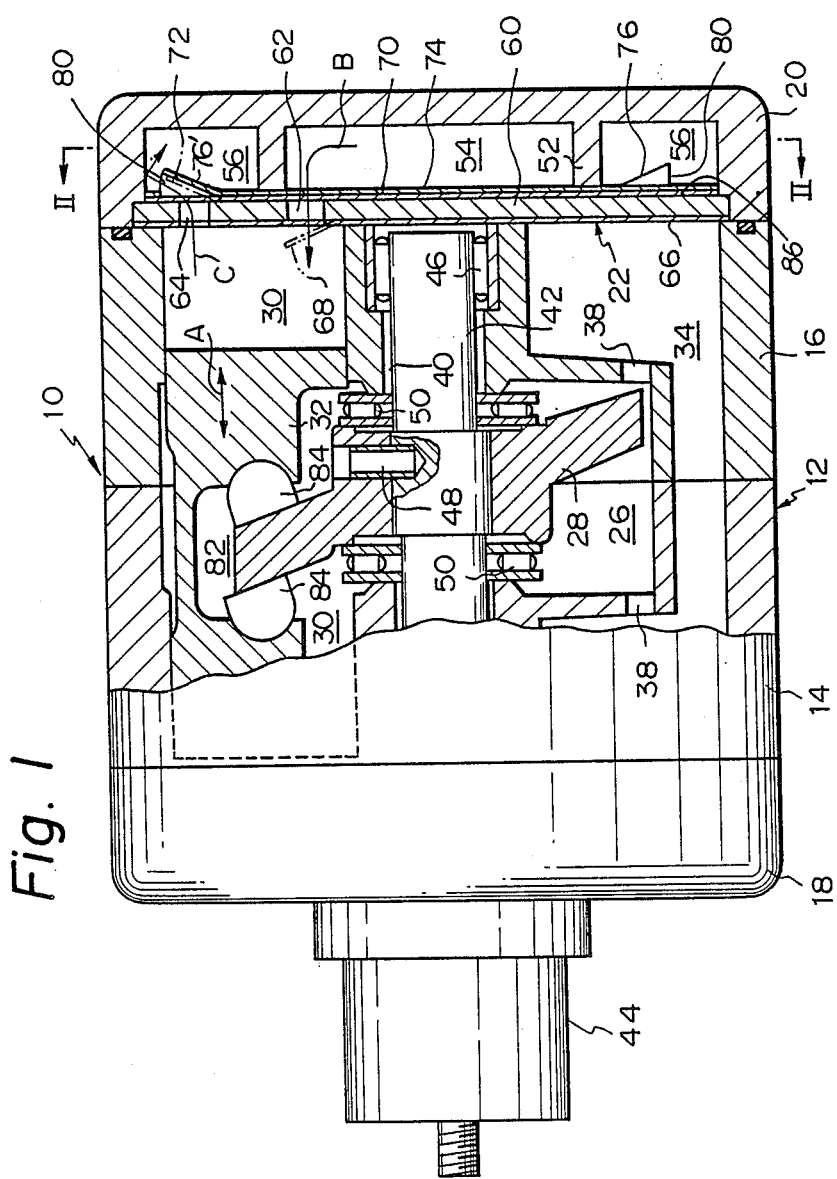
FIG. 1 is a side view of a multi-piston swash plate type compressor having a damping arrangement for discharge reed valves therein, an essential portion of which is shown as a longitudinal sectional view.

With reference to FIG. 1, a multi-piston swash plate type compressor according to this invention, generally designated by reference numeral 10, comprises a cylinder block body 12, assembled as a unit by a pair of cylinder block halves 14 and 16, dish-like housing members 18 and 20 mounted on the end faces of the assembled cylinder block member 12, respectively, and a disc-like reed valve assembly 22 (In FIG. 1, only one is shown) disposed between each of the dish-like housing members 18 and 20 and the corresponding end face of the cylinder block body 12, respectively. All of these parts are assembled together by five elongated screws 24 (FIG. 2) which extend from one of the dish-like housing members 18 and 20 into the other thereof through the disc-like reed valve assembles 22 and the cylinder block body 12 therebetween.

The cylinder block halves 14 and 16 have a cylindrical recess formed at the opposed inner side faces thereof, and when assembled as a unit to form the cylinder block body 12, both the cylindrical recesses thereof define a swash plate chamber 26 in which a swash plate member 28 is disposed. Although FIG. 1 shows only a pair of cylinder bores 30, each of the cylinder block halves 14 and 16 has five cylinder bores 30 formed radially and circumferentially therein, which are spaced from each other at regular intervals. The five cylinder bores 30 of the cylinder block half 14 are aligned and registered with those of the cylinder block half 16, respectively, and each pair of the aligned cylinder bores of the block halves 14 and 16 slidably receives a common piston member 32 which is slidably engaged with the swash plate member 28 in a manner as mentioned hereinafter.

The cylinder block body 12 also includes a chamber 34 which is partially defined by slot sections formed in the cylinder block halves 14 and 16, and which is in communication with an evaporator of an air-conditioning system (not shown) incorporated into a vehicle such as an automobile, so that the chamber 34 is fed with a refrigerant including a lubricating oil therefrom. The chamber 34 serves as a reservoir for lubricating oil which is separated from the refrigerant. As can be seen from FIG. 1, the chamber or the lubricating oil reservoir 34 is in communication with the swash plate chamber 26 through holes 38 formed in the cylinder block halves 14 and 16.

As shown in FIG. 1, the cylinder block body 12 has a central axial bore 40 which is defined by central axial bore sections formed in the cylinder block halves 14 and 16. The central axial bore 40 receives a shaft member 42 which extends through the swash plate chamber 26 and one end portion of which is protruded behind the end face of the dish-like housing member 18. This end portion is adapted to be operationally connected to a prime motor of the vehicle for rotation of the shaft member 42. As can seen from FIG. 1, the protruded end portion of the shaft member 42 is partially covered by a bushing member 44 into which a well known rotary seal device is incorporated to prevent leakage of the refrigerant from the compressor. The shaft member is rotatably supported within the central axial bore 40 by a pair of radial bearings 46 which are provided in the axial bore sections of the cylinder block halves 14 and 16, respectively.

The swash plate member 28 is fixedly mounted by a set screw 48 on the shaft member 42 within the swash plate chamber 26 so that the swash plate member 26 is rotationally driven by the prime motor of the vehicle. Since the swash plate member 28 is subjected to a thrust force during a rotational operation thereof, a pair of thrust bearings 50 is provided around the shaft member 42 at the opposite side to a central portion of the swash plate member 28.

The dish-like housing member 20, which may be substantially constructed in the same manner as the dish-like housing member 18, is provided with an annular partition wall 52 which is arranged therein so as to define an inner circular suction chamber 54 and an outer annular discharge chamber 56 between the outer surface of the disc-like reed valve assembly 22 and the inner bottom surface of the dish-like housing member 20. In this embodiment, the suction chamber 54 is communicated with the interior of the cylinder block body 12 (namely, the swash plate chamber 26 and the oil reservoir 34) through a suitable passage means (not shown) formed in the cylinder block body 12, so that the suction chamber is fed with the refrigerant including the lubricating oil from the interior thereof. The discharge chamber 56 is communicated with a condenser of the air-conditioning system through a suitable passage formed in the cylinder block body 12, which is designated by reference numeral 58 in FIG. 2.

Figure 2:
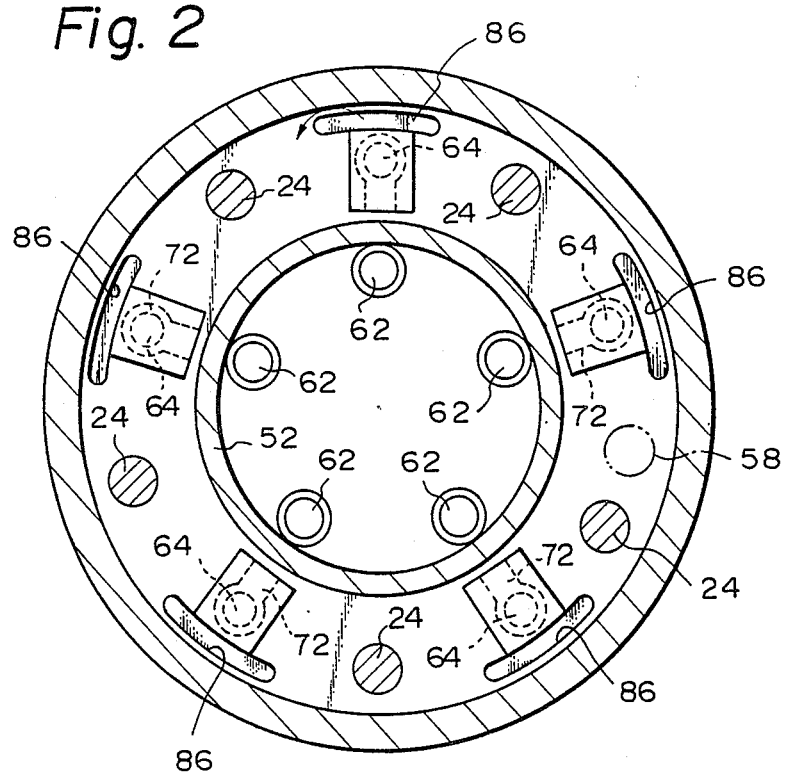
FIG. 2 is a cross-sectional view taken along the line II—II of FIG. 1.

The disc-like reed valve assemblies 22, which may be identical with each other, include a circular end plate member 60 having five sets of a suction port 62 and a discharge port 64 formed radially and circumferentially therein, which are spaced from each other at regular intervals, as shown in FIG. 2. Both the suction and discharge ports 62 and 64 in each set, which are radially aligned with each other, are encompassed within an end opening area of the corresponding one of the cylinder bores 30, as can be seen from FIG. 1.

The disc-like reed valve assembly 22 also includes a first reed valve sheet 66 disposed between the corresponding end face of the cylinder block body 12 and the inner side surface of the end plate member 60. The first reed valve sheet 66 has five suction reed valve elements 68 (In FIG. 1, only one is shown) formed radially and circumferentially therein. Each of the suction reed valve elements 68 may be obtained by stamping, which is carried out in such a manner that a portion of the suction reed valve element 68 becomes a hinge integrated with the first reed valve sheet 66. The five reed valve elements 68 are arranged in registration with the five suction ports 62, respectively, whereby each suction red valve element 68 can be moved around the hinge portion thereof so as to open and close the suction port 62.

The disc-like reed valve assembly 22 further includes a second reed valve sheet 70 attached to the outer side surface of the end plate member 60. The second reed valve sheet 70 has five discharge reed valve elements 72 formed radially and circumferentially therein. Each of the discharge reed valve elements 72 may be obtained in the same manner as the suction reed valve elements 68. The five discharge reed valve elements 72 are arranged in registration with the discharge ports 64, respectively, whereby each discharge reed valve element 64 can be moved around the hinge portion thereof so as to open and close the discharge port 64.

Figure 3:
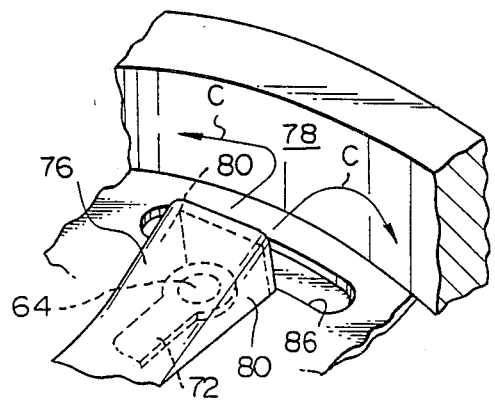
FIG. 3 is a partially perspective view of a damping arrangement for the discharge reed valves, which is incorporated into the compressor of FIG. 1.

Furthermore, the disc-like reed valve assembly 22 includes a retainer plate member 74 attached to the second reed valve sheet 70. The retainer plate member 74 has five retainer elements 76 formed radially and circumferentially therein. Preferably, each of the retainer elements 76 is constructed by stamping, which is carried out in such a manner that a portion of the retainer element 76 becomes a connection integrated with the retainer plate member 74, and then bending the stamped element at the connection thereof so that it slopes away from the surface of the retainer plate member 74 toward the peripheral and inner wall surface 78 of the suction chamber 56, as shown in FIG. 3. When the retainer element 76 is obtained by bending the stamped element at the connection thereof, a triangle side opening is formed between each of the side edges of the retainer element 76 and the surface of the retainer plate member 74. These opposed triangle side openings are closed by a pair of triangle side wall portions 80 which are, for example, welded to the opposed side edges of the retainer element 76 and the edges and the corresponding side edges of the stamped opening in the retainer plate member 74. The five retainer elements 76 are arranged in alignment with the five discharge reed valve elements 72, respectively, whereby the movement of each discharge reed valve element 72 is restricted by the corresponding retainer element 76, that is, a lift of the discharge reed valve element 72 is restrained in accordance with the sloping angle of the retainer element 76.

As shown representatively in FIG. 1, each of the five piston members 32 is provided with a recess 82 which is directed to the shaft member 42 for receiving the peripheral portion of the swash plate member 28. A pair of semi-spherical shoe elements 84 is provided within the recess 82 of each piston member 32 at opposite sides of the peripheral portion of the swash plate member 28. As illustrated, each of the opposite side walls of the recess 82 has a semispherical concave formed therein, which has a complementary relationship with the spherical surface of the shoe element 84. The spherical surface of the shoe element 84 is in slidable contact with the corresponding spherical concave and the circular flat surface thereof is in slidable contact with the corresponding side face of the peripheral portion of the swash plate member 28, whereby each piston member 32 can be reciprocated, as indicated by arrow A in FIG. 1, in the aligned cylinder bore 30 of the cylinder block halves 14 and 16 by rotation of the swash plate member 28 so that the piston member 28 alternately executes a suction stroke and a compression stroke.

When each piston member 32 executes the suction stroke, the suction reed valve element 68 is opened and the discharge reed valve element 72 is closed, so that the refrigerant is introduced from the suction chamber 54 into the cylinder bore 30 through the suction port 62, as indicated by arrow B in FIG. 1. Then, when the piston member 32 executes the compression stroke, the suction reed valve element is closed and the discharge reed valve element is opened, so that the introduced refrigerant is compressed and discharged from the cylinder bore 30 into the discharge chamber 56 through the discharge reed valve 72, as indicated by arrow C in FIGS. 1 and 3.

As mentioned above, since the opposed triangle side openings between the side edges of the retainer element 74 and the surface of the retainer plate member 74 are closed by a pair of triangle side wall portions 80, all of the refrigerant discharged from the discharge port 64 is impinged on the peripheral and inner wall surface 78 of the discharge chamber 56 so that lubricating oil is separated from the discharged refrigerant, whereby the separated oil can serve as an oil supply source which contributes to formation of an effective damping and sealing oil layer between the discharge reed valve element 72 and the valve seat thereof.

Preferably, a recess 86 is provided in the retainer plate member at the vicinity of the exit opening defined by each of the retainer element 76 and the triangle side wall portions 80 thereof so that the recess 86 is communicated with the stamped opening in the retainer plate member 74 for the formation of the retainer element 76. With this arrangement, it is possible to reserve and guide the separated oil as an oil flow toward the discharge reed valve element. Here, it should be noted that such an oil flow is subjected to not only gravity but also various dynamic forces, because the compressor is carried by a vehicle such as an automobile, whereby the separated oil can be fed to the discharge reed valve elements regardless of the locations thereof.

Finally, it will be understood by those skilled in the art that the foregoing description is of a preferred embodiment of the disclosed device, and that various changes and modifications may be made to the present invention without departing from the spirit and scope thereof.

What is claimed is:

1. A multi-piston swash plate type compressor for an air-conditioning system used in a vehicle such as an automobile, which comprises:
   a cylinder block means in which a swash plate chamber is formed for receiving a swash plate member, and which has cylinder bores radially formed and arranged with respect to a central axis thereof, each of said cylinder bores receiving a piston member so as to be slidably engaged with said swash plate member to reciprocate said piston member in the corresponding cylinder bore by rotation of said swash plate member, said swash plate member being fixedly mounted on a shaft member which extends into said swash plate chamber through an axial bore formed in said cylinder block means, and which is adapted to be connected to a prime mover of the vehicle for rotation of said swash plate member;

housing means provided on said cylinder block means for forming a suction chamber which is communicated with said cylinder bores through the intermediary of a suction reed valve element and a discharge chamber which is communicated with said cylinder bores through the intermediary of a discharge reed valve element, said suction chamber being in communication with an evaporator of the air-conditioning system so as to be fed with a refrigerant including lubricating oil therefrom, said discharge chamber being in communication with a condenser of the air-conditioning system for feeding a compressed refrigerant thereto; and means for guiding all of a compressed refrigerant discharged through said discharge reed valve element to impinge on a peripheral and interior wall surface of said discharge chamber so as to separate a lubricating oil from the discharged refrigerant, whereby the separated lubricating oil serves as an oil source for forming an effective damping and sealing oil layer between said discharge reed valve element and the valve seat thereof, said means also restraining a lift of said discharge reed valve element.

2. A multi-piston swash plate type compressor as set forth in claim 1, further comprising oil-guiding means for reserving and guiding the separated lubricating oil to positively cause an oil flow toward the discharge reed valve element.

3. A multi-piston swash plate type compressor for an air-conditioning system used in a vehicle such as an automobile, which comprises:

a cylinder block body which is assembled from a pair of cylinder block halves to form a swash plate chamber therebetween, said cylinder block halves having a same number of cylinder bores which are radially formed and arranged with respect to a central axis of said cylinder block body, the cylinder bores of one of said cylinder block halves being aligned and registered with the cylinder bores of the other cylinder block half, respectively, with said swash plate chamber intervening therebetween;

common piston members slidably received in pairs of aligned cylinder bores, respectively;

a swash plate member which is disposed within said swash plate chamber to be slidably engaged with said common piston members so that the piston members are reciprocated in said pairs of aligned cylinder bores, respectively, by rotation of said swash plate member;

a shaft member which extends into an axial bore of said cylinder block body and passes through said swash plate chamber and on which said swash plate member is fixedly mounted;

a pair of dish-like housing members which are mounted on end faces of said cylinder block body, respectively, so as to form a suction chamber and a discharge chamber between each of said dish-like housing member and the corresponding end face of said cylinder block body;

a disc-like reed valve assembly which is disposed between each of said dish-like housing members and the corresponding end face of said cylinder block body, said disc-like reed valve assembly including an end plate member having sets of a suction port and a discharge port, each set of which is in communication with the corresponding cylinder bore, a first valve sheet member disposed between the corresponding end face of said cylinder block body and the inner side surface of said end plate member and having suction reed valve elements formed therein, each of which is arranged so as to open and close the corresponding suction port of said end plate member, a second valve sheet member attached to the outer side surface of said end plate member and having discharge reed valve elements formed therein, each of which is arranged so as to open and close the corresponding discharge port of said end plate member, and a retainer plate member then attached to said second valve sheet member, both said second valve sheet member and said retainer plate member having through holes each of which is aligned and registrated with the corresponding suction port of said end plate member;

said suction chamber being adapted to be communicated with an evaporator of the air conditioning system so as to be fed with a refrigerant including a lubricating oil therefrom, said discharge chamber being in communication with a condenser of the air-conditioning system for feeding a compressed refrigerant thereto; and said retainer plate member includes means for guiding all of a compressed refrigerant discharged from the corresponding discharge port through the corresponding discharge reed valve element to impinge on a peripheral and interior wall surface of said discharged refrigerant, whereby the separated lubricating oil from the discharged refrigerant, whereby the separated lubricating oil serves as an oil source for forming an effective damping and sealing oil layer between the discharge reed valve element and the valve seat thereof, said means including a plurality of retainer elements formed in said retainer plate, each retainer element arranged so as to restrain a lift of a corresponding discharge reed valve element.

4. A multi-piston swash plate type compressor as set forth in claim 3, wherein each of said retainer elements is formed in the shape of a hollow wedge having a thickest portion thereof facing the peripheral and interior wall surface of said discharge chamber, each retainer element having opposed triangle side wall portions which extend from the opposed side edges of the sloped retainer element to the surface of said retainer plate member, whereby all of the compressed refrigerant discharged from each of the discharge ports through the corresponding discharge reed valve element is impinged on the peripheral and interior wall surface of said discharge chamber.

5. A multi-piston swash plate type compressor as set forth in claim 4, wherein a recess is formed in the surface of said retainer plate member in the vicinity of an exit opening defined by each of said retainer elements and the opposed triangle side wall portions thereof, so that said recess serves to reserve and guide the separated lubricating oil as an oil flow toward the corresponding discharge reed valve element.

* * * * *